US012634336B2

(12) United States Patent (10) Patent No.: US 12,634,336 B2
Chen (45) Date of Patent: May 19, 2026

(54) ARTIFICIAL INTELLIGENCE FRONTEND SYSTEM, ARTIFICIAL INTELLIGENCE FRONTEND OPERATION METHOD, AND COMPUTER-READABLE RECORDING MEDIUM WITH STORED PROGRAM

(71) Applicant: Wistron Corporation, New Taipei City (TW)

(72) Inventor: Chih-Ming Chen, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 36 days.

(21) Appl. No.: 18/736,735

(22) Filed: Jun. 7, 2024

(65) Prior Publication Data

US 2025/0317471 A1     Oct. 9, 2025

(30) Foreign Application Priority Data

Apr. 3, 2024    (TW) ................................. 113112831

(51) Int. Cl.
*H04L 9/40* (2022.01)
*H04L 51/02* (2022.01)
(52) U.S. Cl.
CPC .......... *H04L 63/1441* (2013.01); *H04L 51/02* (2013.01)
(58) Field of Classification Search
None
See application file for complete search history.

(56) References Cited

U.S. PATENT DOCUMENTS

| | | | | |
|---|---|---|---|---|
| 11,170,769 B2 * | 11/2021 | Schoenmackers | ...... | G10L 15/07 |
| 11,689,486 B1 * | 6/2023 | Bates | .................... | G06F 40/237 |
| | | | | 709/206 |
| 12,069,019 B2 * | 8/2024 | Bates | ..................... | G06F 40/30 |

(Continued)

FOREIGN PATENT DOCUMENTS

| | | |
|---|---|---|
| CN | 112487157 A | 3/2021 |
| CN | 113987317 A | 1/2022 |

OTHER PUBLICATIONS

Text Adversarial Attacks and Defenses: Issues, Taxonomy, and Perspectives, by Han.Xu et al., Hindawi Security and Communications Networks, vol. 22, Article ID 6458488, pp. 1-25, Apr. 23, 2022 (Year: 2022).*

(Continued)

*Primary Examiner* — Backhean Tiv
(74) *Attorney, Agent, or Firm* — McClure, Qualey & Rodack, LLP

(57) ABSTRACT
An artificial intelligence frontend system, an artificial intelligence frontend operation method, a computer-readable recording medium with a stored program, and a non-transitory computer program product, where the artificial intelligence frontend operation method includes: executing an external clarification procedure in response to receiving a query by an input frontend to obtain an external clarification query; directing the external clarification query to an input filter element; and executing a filtering procedure by the input frontend on the external clarification query via the input filter element to filter the external clarification query and sending an external clarification query which is filtered to an external chatbot via the input filter element.

14 Claims, 8 Drawing Sheets

(56)     References Cited

U.S. PATENT DOCUMENTS

| | | | | |
|---|---|---|---|---|
| 12,141,534 | B2 * | 11/2024 | Moore | G06N 5/02 |
| 2011/0231353 | A1 * | 9/2011 | Wang | G06Q 10/10 |
| | | | | 706/45 |
| 2012/0095835 | A1 * | 4/2012 | Makar | G06N 20/00 |
| | | | | 705/14.66 |
| 2016/0217472 | A1 * | 7/2016 | Podgorny | G06Q 40/123 |
| 2018/0032576 | A1 * | 2/2018 | Romero | G06F 21/31 |
| 2018/0173999 | A1 * | 6/2018 | Renard | G06N 3/08 |
| 2018/0359132 | A1 * | 12/2018 | Salameh | G06N 3/045 |
| 2019/0332680 | A1 * | 10/2019 | Wang | G10L 15/07 |
| 2021/0288925 | A1 * | 9/2021 | Tagra | G06F 16/9558 |
| 2021/0326344 | A1 * | 10/2021 | Schaller | G06F 9/453 |
| 2023/0283582 | A1 * | 9/2023 | Bates | H04L 51/214 |
| | | | | 709/206 |
| 2025/0053835 | A1 * | 2/2025 | Stephan | G06N 5/04 |
| 2025/0219980 | A1 * | 7/2025 | Lee | G06F 40/237 |
| 2025/0258685 | A1 * | 8/2025 | Crabtree | A63F 13/40 |

OTHER PUBLICATIONS

Examination report dated Jul. 30, 2025, listed in correspondent
Taiwan patent application No. 113112831.
Extended European search report dated Feb. 5, 2025, listed in
related Europe patent application No. 24196654.8 .

* cited by examiner

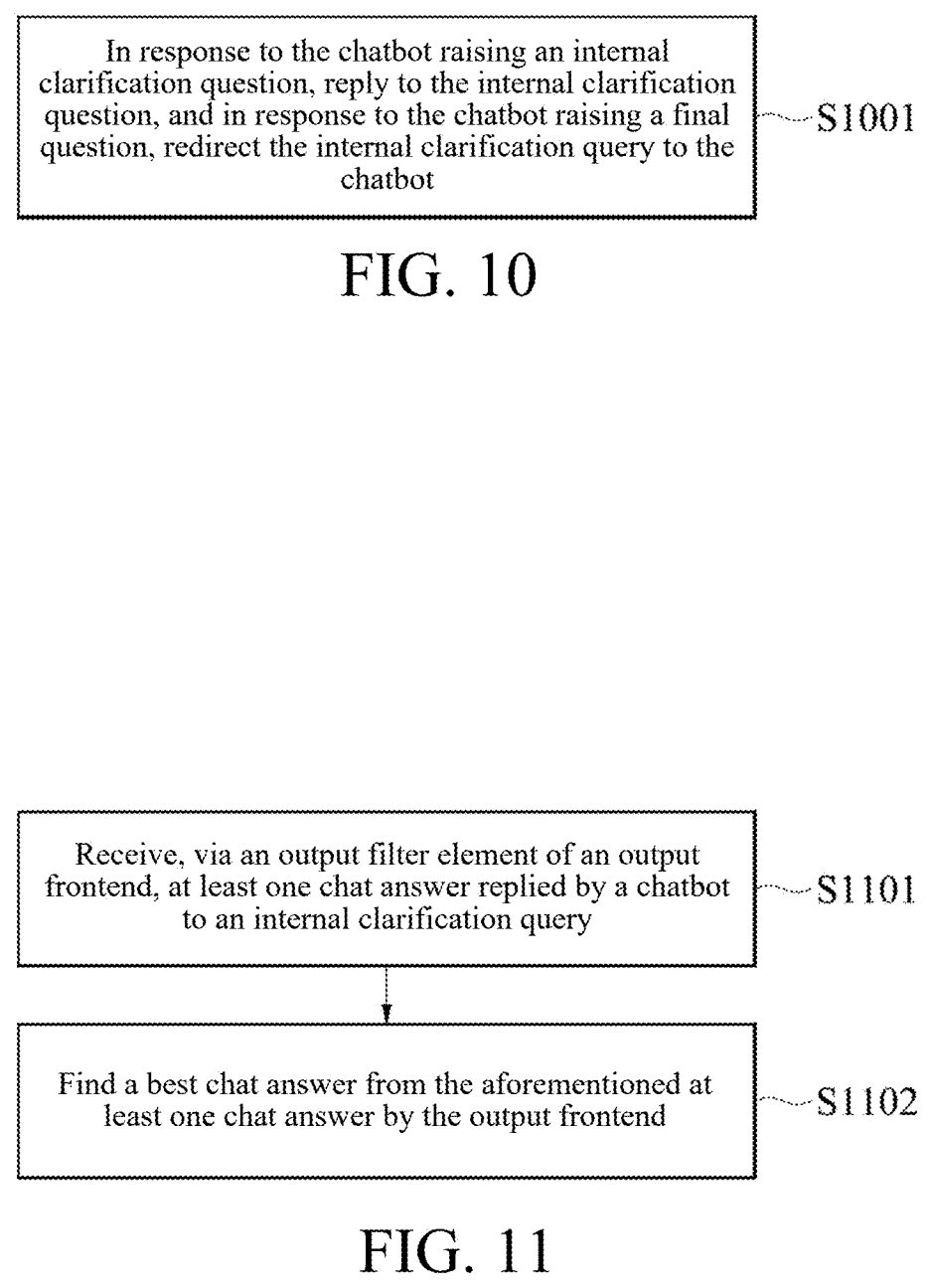

In response to the chatbot raising an internal clarification question, reply to the internal clarification question, and in response to the chatbot raising a final question, redirect the internal clarification query to the chatbot ~ S1001

FIG. 10

Receive, via an output filter element of an output frontend, at least one chat answer replied by a chatbot to an internal clarification query ~ S1101

Find a best chat answer from the aforementioned at least one chat answer by the output frontend ~ S1102

FIG. 11

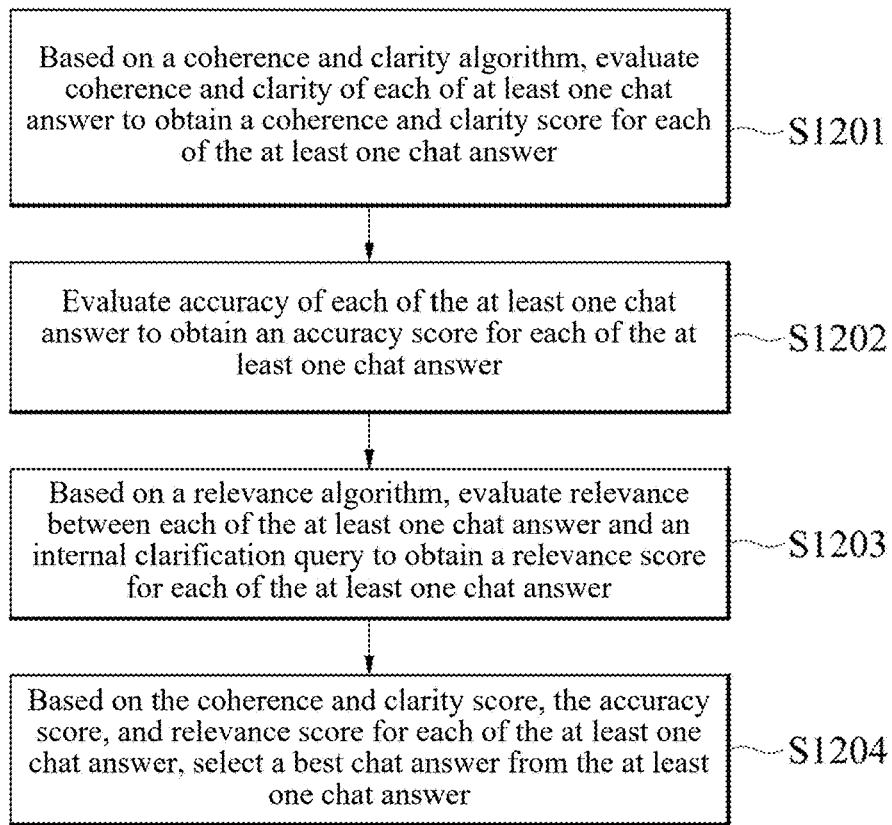

Based on a coherence and clarity algorithm, evaluate coherence and clarity of each of at least one chat answer to obtain a coherence and clarity score for each of the at least one chat answer ～S1201

Evaluate accuracy of each of the at least one chat answer to obtain an accuracy score for each of the at least one chat answer ～S1202

Based on a relevance algorithm, evaluate relevance between each of the at least one chat answer and an internal clarification query to obtain a relevance score for each of the at least one chat answer ～S1203

Based on the coherence and clarity score, the accuracy score, and relevance score for each of the at least one chat answer, select a best chat answer from the at least one chat answer ～S1204

FIG. 12

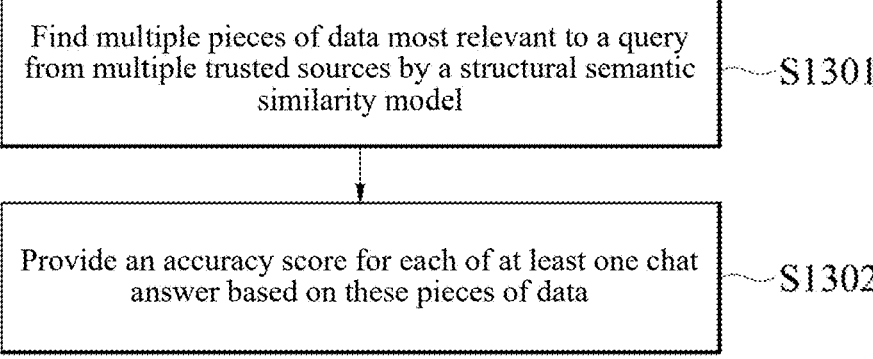

Find multiple pieces of data most relevant to a query from multiple trusted sources by a structural semantic similarity model ～S1301

Provide an accuracy score for each of at least one chat answer based on these pieces of data ～S1302

ARTIFICIAL INTELLIGENCE FRONTEND SYSTEM, ARTIFICIAL INTELLIGENCE FRONTEND OPERATION METHOD, AND COMPUTER-READABLE RECORDING MEDIUM WITH STORED PROGRAM

CROSS-REFERENCE TO RELATED APPLICATION

This non-provisional application claims priority under 35 U.S.C. § 119(a) to Patent Application No. 113112831 filed in Taiwan, R.O.C. on Apr. 3, 2024, the entire contents of which are hereby incorporated by reference.

BACKGROUND

Technical Field

The disclosure relates to the field of artificial intelligence, and in particular relates to a technique of operation method for a large language model.

Related Art

A large language model (LLM)-based chatbot has traditionally been difficult for a user to make an accurate requirement when inputting a query from the user, which leads to an inaccurate or irrelevant chat answer. Moreover, an attack surface of the LLM-based chatbot enlarges, allowing an attacker to invade the large language model without accessing an internal network of the chatbot.

SUMMARY

In view of this, some embodiments of the disclosure provide an artificial intelligence frontend system, an artificial intelligence frontend operation method, a computer-readable recording medium with a stored program, and a non-transitory computer program product to improve the problems in the related art.

Some embodiments of the disclosure provide an artificial intelligence frontend system, including an input frontend, where the input frontend includes an input filter element; the input frontend is configured to execute the following steps: executing an external clarification procedure in response to receiving a query to obtain an external clarification query, and directing the external clarification query to the input filter element; and executing a filtering procedure via the input filter element on the external clarification query to filter the external clarification query, and sending the filtered external clarification query to an external chatbot via the input filter element.

Some embodiments of the disclosure provide an artificial intelligence frontend operation method, suitable for an artificial intelligence frontend, the artificial intelligence frontend including an input frontend, where the input frontend includes an input filter element; and the artificial intelligence frontend operation method includes: executing an external clarification procedure in response to receiving a query by the input frontend to obtain an external clarification query, and directing the external clarification query to the input filter element; and executing a filtering procedure by the input frontend on the external clarification query via the input filter element to filter the external clarification query, and sending the filtered external clarification query to an external chatbot via the input filter element.

The disclosure provides a computer-readable recording medium with a stored program and a non-transitory computer program product, where the aforementioned artificial intelligence frontend operation method can be completed after a processor loads and executes the program.

Based on the above, some embodiments of the disclosure provide an artificial intelligence frontend system, an artificial intelligence frontend operation method, a computer-readable recording medium with a stored program, and a non-transitory computer program product, where an external clarification query is obtained by executing an external clarification procedure and a filtering procedure is executed on the external clarification query to filter the external clarification query, and thus, a query from a user can be clearly defined, and an attacker is prevented from attacking a large language model of a chatbot.

BRIEF DESCRIPTION OF THE DRAWINGS

FIG. 10 is a flowchart of an artificial intelligence frontend operation method illustrated in accordance with some embodiments of the disclosure.

FIG. 11 is a flowchart of an artificial intelligence frontend operation method illustrated in accordance with some embodiments of the disclosure.

FIG. 12 is a flowchart of an artificial intelligence frontend operation method illustrated in accordance with some embodiments of the disclosure.

FIG. 13 is a flowchart of an artificial intelligence frontend operation method illustrated in accordance with some embodiments of the disclosure.

DETAILED DESCRIPTION

Figure 1:
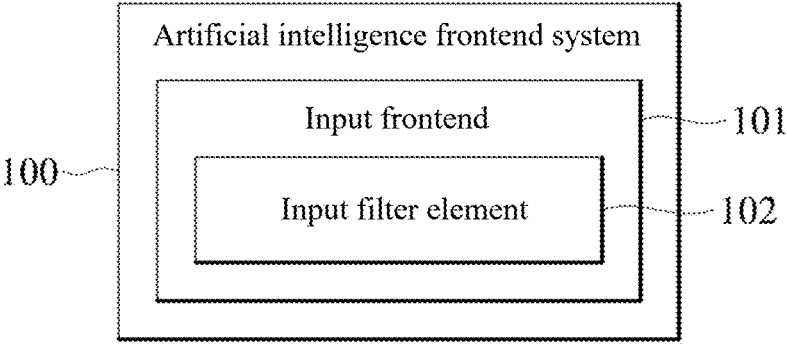
FIG. 1 is a block diagram of an artificial intelligence frontend system illustrated in accordance with an embodiment of the disclosure.

For the aforementioned and other technical contents, features and effects of the disclosure, they are clearly presented in the following detailed descriptions of embodiments with reference drawings. The thickness or size of each element shown in the drawings is expressed in an exaggerated or omitted or approximate manner for the understanding and reading of the persons skilled in the art, and the size of each element is not exactly based on its actual size, and is not intended to limit the conditions under which the disclosure can be implemented. Therefore, it does not have technical substantive significance. Any modifications to the structure, changes in proportion, or adjustments in size, without affecting the efficacy and objectives that can be achieved by the disclosure, shall still fall within the scope of the technical content disclosed in the disclosure. The same reference numerals in all drawings will be used for representing the same or similar elements. The term "connection" mentioned in the following embodiments may refer to any direct or indirect, wired or wireless means of connection.

Figure 2:
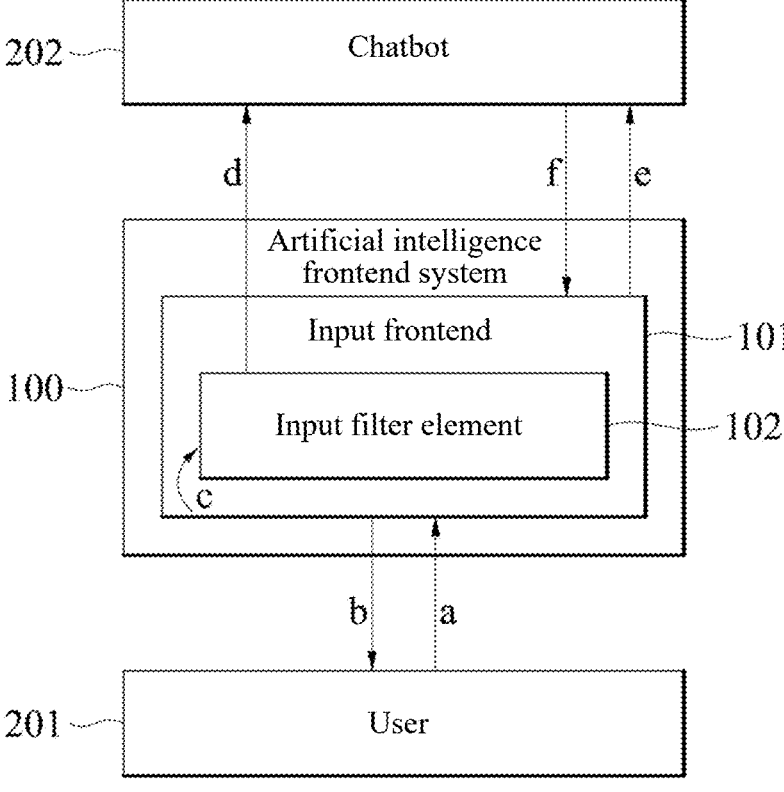
FIG. 2 is a schematic diagram of operation of an artificial intelligence frontend illustrated in accordance with an embodiment of the disclosure.

FIG. 1 is a block diagram of an artificial intelligence frontend system illustrated in accordance with an embodiment of the disclosure. FIG. 2 is a schematic diagram of operation of an artificial intelligence frontend illustrated in accordance with an embodiment of the disclosure. Referring to both FIG. 1 and FIG. 2, in an embodiment illustrated in FIG. 1, an artificial intelligence frontend system 100 includes an input frontend 101, and the input frontend 101 includes an input filter element 102. The artificial intelligence frontend system 100 is used as an interface between a chatbot 202 and a user 201.

An artificial intelligence frontend operation method of some embodiments of the disclosure and how modules of the artificial intelligence frontend system 100 thereof cooperate with each other will be described below in details with the drawings.

Figure 8:
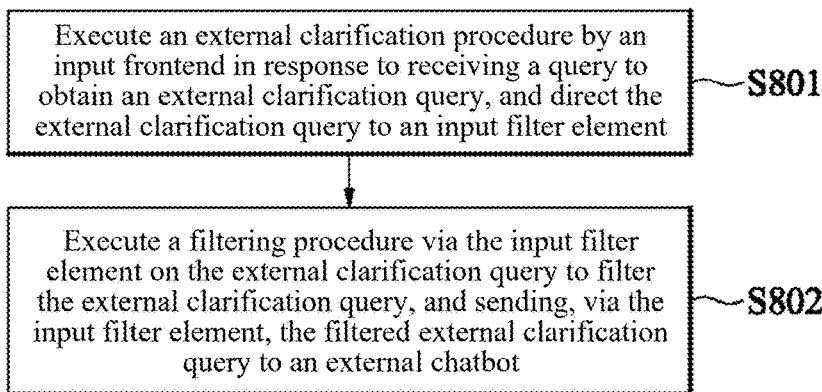
FIG. 8 is a flowchart of an artificial intelligence frontend operation method illustrated in accordance with some embodiments of the disclosure.

FIG. 8 is a flowchart of an artificial intelligence frontend operation method illustrated in accordance with some embodiments of the disclosure. Referring to FIGS. 1, 2 and 8, in an embodiment illustrated in FIG. 8, the artificial intelligence frontend operation method includes steps S801 and S802. In step S801, the input frontend 101 executes an external clarification procedure in response to receiving a query from the user 201 (as illustrated in a signal path a in FIG. 2) to obtain an external clarification query. Moreover, the input frontend 101 directs the external clarification query to the input filter element 102 (as illustrated in a signal path c in FIG. 2). In step S802, the input frontend 101 executes a filtering procedure via the input filter element 102 on the external clarification query to filter the external clarification query, and sends the filtered external clarification query to an external chatbot 202 via the input filter element 102 (as illustrated in a signal path d in FIG. 2).

In this embodiment, the input frontend 101 uses proactive learning to ask the user 201 to clarify requirements. The proactive learning is a type of active learning, where the input frontend 101, as an agent for the proactive learning, can query multiple sources of information as oracles with different costs and reliabilities. The aforementioned multiple sources of information, for example, are the aforementioned user 201. A partially observable Markov decision process (POMDP) formula (stored in the input frontend 101) for the proactive learning allows the agent to optimize its query based on its belief over the true labels of their data points. This can clarify the requirements of the user 201 by asking/ answering relevant questions of the user 201 that reduce uncertainty and improve accuracy. In the article: W. Kyle Hollins, Z. Shlomo, A pomdp formulation of proactive learning, in: Thirtieth AAAI Conference on Artificial Intelligence, 2016, pp. 3202-3208, a proactive learning (PAL) question is transformed into POMDP. The PAL question is defined as active learning (AL) with multiple reluctant, fallible, and cost-varying oracles. In this formula, the agent selects an oracle at each time step to label a data point while maintaining a belief over the true underlying correctness of its current dataset's labels.

In some embodiments of the disclosure, the aforementioned filtering procedure includes: executing an input transformation on the external clarification query as a defense mechanism to eliminate adversarial perturbations. An adversarial attack is a type of cyber attack against natural language processing (NLP) models, which aims to fool an NLP model by introducing small adversarial perturbations into input data of the NLP model. These perturbations can be designed to be grammatically valid and semantically similar to original input. There are various types of adversarial attacks against the NLP model, including gradient-based attacks, score-based attacks, decision-based attacks, and blind-based attacks. For the adversarial attacks and the defense mechanisms such as the input transformation, refer to the article: Xu Han, Ying Zhang, Wei Wang, et al. Text Adversarial Attacks and Defenses: Issues, Taxonomy, and Perspectives. Security and Communication Networks, 2022, 2022:1. DOI:10.1155/2022/6458488.

In some embodiments of the disclosure, the aforementioned filtering procedure includes: based on the context of a dialogue (including a domain queried by the user 201 and specific information required by the user 201), adding a more detailed query requirement into the external clarification query undergoing the input transformation.

In some embodiments of the disclosure, the aforementioned filtering procedure includes: transforming the external clarification query undergoing the input transformation into an open question form. That is, the input frontend 101 will transform the external clarification query undergoing the input transformation into an open question form (for example, how many alternative solutions are there for XXX? What are the advantages and disadvantages of XXX?) before sending it to the external chatbot 202, rather than asking the external chatbot 202 in a closed question form (for example, can XXX support YYY? Is XXX equal to YYY?).

Figure 9:
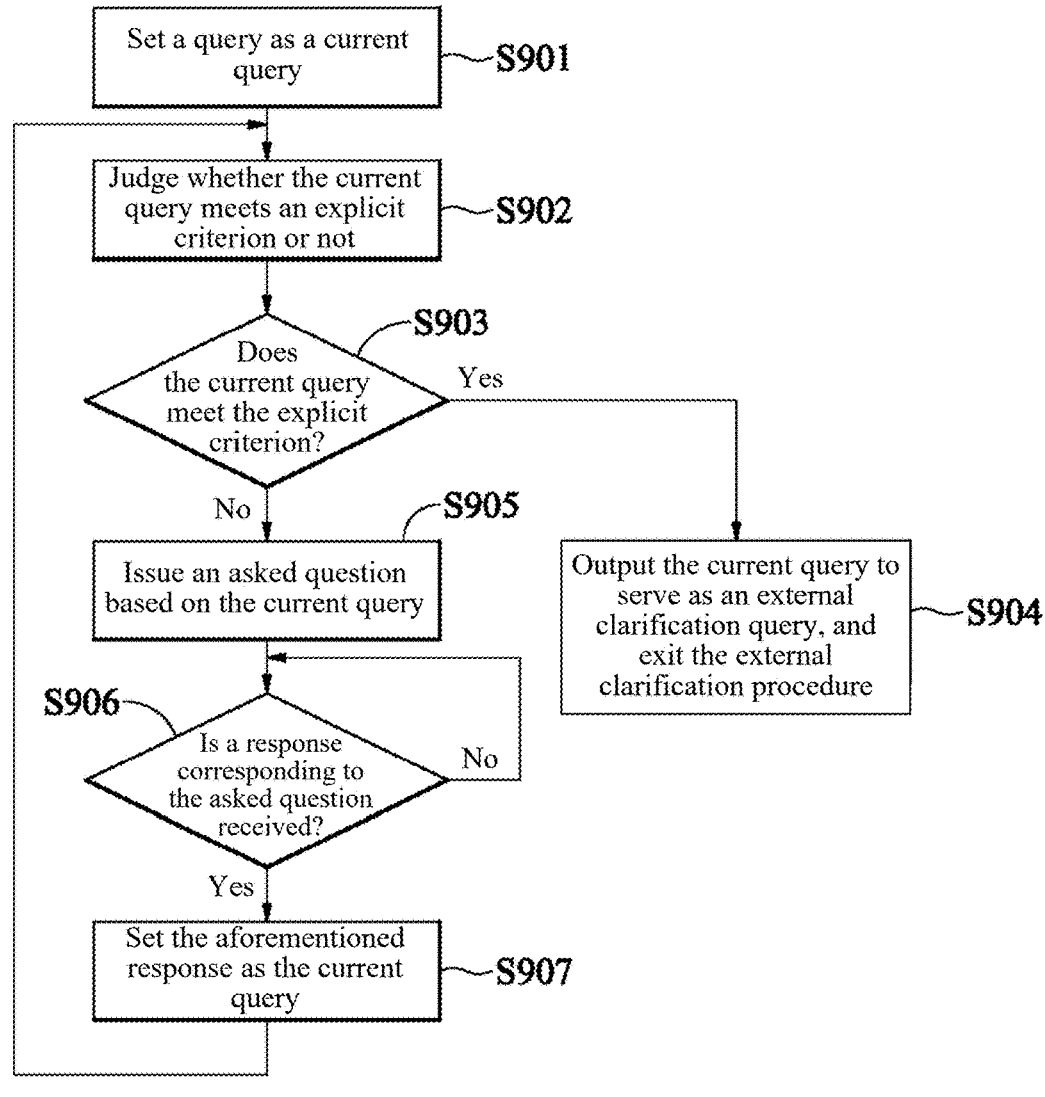
FIG. 9 is a flowchart of an artificial intelligence frontend operation method illustrated in accordance with some embodiments of the disclosure.

FIG. 9 is a flowchart of an artificial intelligence frontend operation method illustrated in accordance with some embodiments of the disclosure. Referring to FIGS. 1, 2, 8 and 9, in an embodiment illustrated in FIG. 9, the aforementioned external clarification procedure includes steps S901 to S907. In step S901, the input frontend 101 sets the query from the aforementioned user 201 as a current query. The user 201 is the aforementioned oracle. In step S902, the input frontend 101 judges whether the current query meets an explicit criterion or not. In step S903, if the input frontend 101 judges that the current query meets the explicit criterion, then step S904 is executed. If the input frontend 101 judges that the current query does not meet the explicit criterion, then step S905 is executed. In step S904, the input frontend 101 outputs the current query to serve as an external clarification query, and exits the external clarification procedure. In step S905, the input frontend 101 issues an asked question to the user 201 based on the current query (as illustrated in a signal path b in FIG. 2) and proceed to step S906. In step S906, the input frontend 101 waits for a response from the user 201 corresponding to the aforementioned asked question. If the response from the user 201 corresponding to the aforementioned asked question is not received, the input frontend 101 continues to wait. If the input frontend 101 receives the response from the user 201 corresponding to the aforementioned asked question, step S907 is executed. In step S907, the input frontend 101 sets the response from the user 201 as the current query, and returns to step S902 to execute steps S902 to S907. It is worth noting that from the flows illustrated in FIG. 9, it can be seen that the input frontend 101 in the external clarification procedure can issue the asked question to the user 201 based on the current query multiple times (as illustrated in the signal path b in FIG. 2) to make the current query meet the explicit criterion.

FIG. 10 is a flowchart of an artificial intelligence frontend operation method illustrated in accordance with some embodiments of the disclosure. Referring to FIGS. 1, 2, 8, and 10, in step S802, the input filter element 102 sends the filtered external clarification query to the external chatbot 202 (as illustrated in the signal path d in FIG. 2). After receiving the filtered external clarification query, the chatbot 202 can issue an internal clarification question to the input frontend 101 based on the filtered external clarification query to further clarify what is an asked question (as illustrated in a signal path f in FIG. 2). The input frontend 101 then responds to the chatbot 202 based on the aforementioned internal clarification question (as illustrated in a signal path e in FIG. 2). Therefore, in some embodiments of the disclosure, after step S802, the artificial intelligence frontend operation method further includes step S1001. In step S1001, in response to the chatbot 202 raising an internal clarification question, the input frontend 101 replies to the internal clarification question, and in response to the chatbot 202 raising a final question, the input frontend 101 redirects the internal clarification query corresponding to the final question to the chatbot 202 (as illustrated in the signal path e in FIG. 2).

Figure 3:
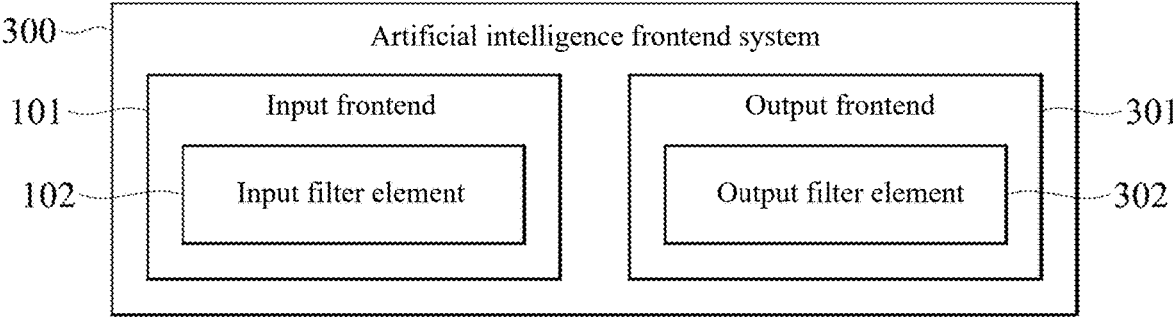
FIG. 3 is a block diagram of an artificial intelligence frontend system illustrated in accordance with an embodiment of the disclosure.

FIG. 3 is a block diagram of an artificial intelligence frontend system illustrated in accordance with an embodiment of the disclosure. Referring to FIG. 3, in the embodiment illustrated in FIG. 3, the artificial intelligence frontend system 300 further includes an output frontend 301 compared to the artificial intelligence frontend system 100, where the output frontend 301 includes an output filter element 302. The input frontend 101 of the artificial intelligence frontend system 300 includes an input filter element 102 that can execute steps S801 to S802, S901 to S907, and S1001.

Figure 4:
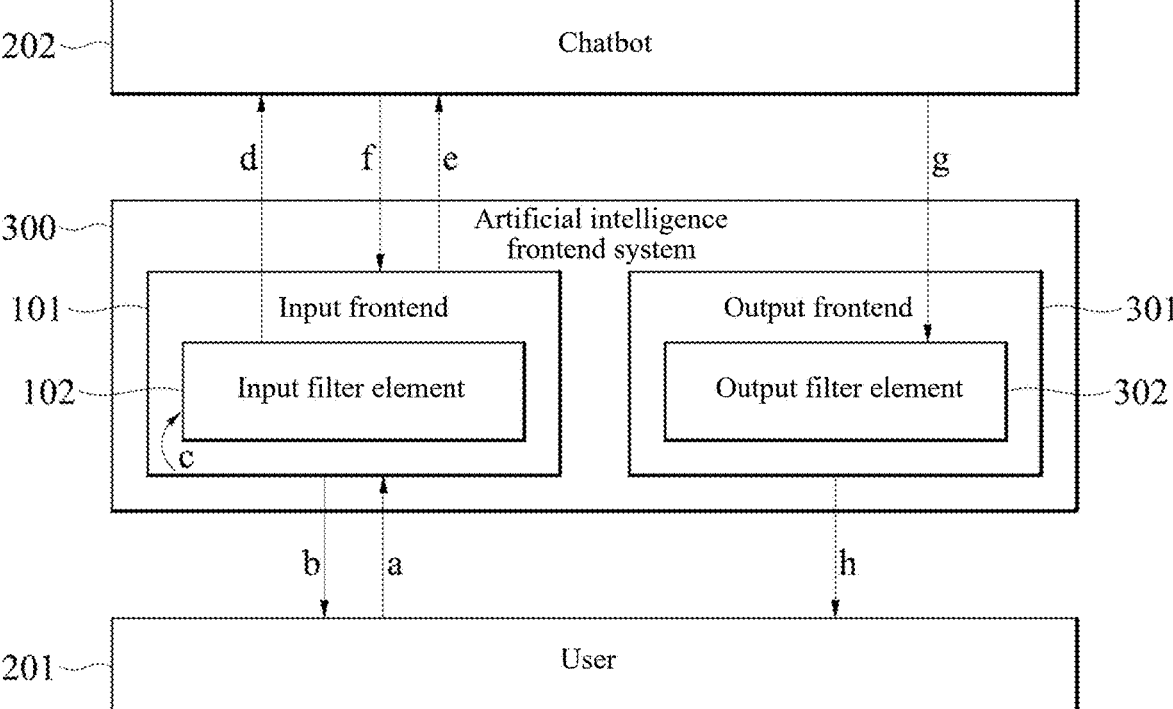
FIG. 4 is a schematic diagram of operation of an artificial intelligence frontend illustrated in accordance with an embodiment of the disclosure.

FIG. 4 is a schematic diagram of operation of an artificial intelligence frontend illustrated in accordance with an embodiment of the disclosure. FIG. 11 is a flowchart of an artificial intelligence frontend operation method illustrated in accordance with some embodiments of the disclosure. Referring to FIGS. 3, 4 and 11, in an embodiment illustrated in FIG. 11, the artificial intelligence frontend operation method includes steps S1101 and S1102. In step S1101, the output frontend 301 receives, via the output filter element 302, at least one chat answer replied by the chatbot 202 to the aforementioned internal clarification query (as illustrated in a signal path g in FIG. 4). In step S1102, the output frontend 301 finds a best chat answer from aforementioned at least one chat answer.

In some embodiments of the disclosure, the artificial intelligence frontend operation method includes executing the following step after step S1102: executing a modification procedure on the best chat answer via the output filter element 302 of the output frontend 301 to modify the best chat answer. After the modification procedure is executed on the best chat answer to modify the best chat answer, the output frontend 301 sends the modified best chat answer to the user 201 (as illustrated in a signal path h in FIG. 4). By executing a modification procedure on the best chat answer to modify the best chat answer, imitation models can be prevented, where the imitation models are used for an imitation attack against the NLP models, where the imitation attack is a type of cyber attack, which aims to reconstruct a local copy or steal functionality of a black-box application programming interface (API). This attack can be used for stealing a valuable model behind a machine learning as a service (MLaaS) system. For the imitation attacks and how to resist them by modifying answers, refer to data recorded at the website https://www.ericswallace.com/imitation.

Referring to FIG. 4 again, in an embodiment illustrated in the drawing, input and output of the chatbot 202 will go through the input frontend 101 and the output frontend 301 of the artificial intelligence frontend system 300. In some embodiments of the disclosure, the artificial intelligence frontend system 300 uses anomaly detection as a defense mechanism to detect anomalies at input and output levels of the chatbot 202 to counter a backdoor attack against natural language processing. The backdoor attack against NLP is a type of network attack where hidden backdoors are embedded in a neural network. These backdoors can be activated by attacker-defined triggers, causing an attacked model to perform maliciously. A model attacked by the backdoors can achieve good performance on a clean test set, but performs poorly on input sentences injected with designed trigger words. For the anomaly detection and the backdoor attack against NLP, refer to the article: W Yang, Y Lin, P Li, J Zhou, X Sun, "Rethinking Stealthiness of Backdoor Attack against NLP Models", ACL-IJCNLP 2021 1, 5543-5557, 2021. 63, 2021, the article: Maqsood, Shaik Mohammed et al. "Backdoor Attack against NLP models with Robustness-Aware Perturbation defense." ArXiv abs/2204.05758 (2022) and the article: Chen, Sishuo et al. "Expose Backdoors on the Way: A Feature-Based Efficient Defense against Textual Backdoor Attacks." Conference on Empirical Methods in Natural Language Processing (2022).

FIG. 12 is a flowchart of an artificial intelligence frontend operation method illustrated in accordance with some embodiments of the disclosure. Referring to FIG. 12, in an embodiment illustrated in FIG. 12, step S1102 include steps S1201 to S1204 to find a best chat answer from the aforementioned at least one chat answer. In step S1201, based on a coherence and clarity algorithm, coherence and clarity of each of the aforementioned at least one chat answer are evaluated to obtain a coherence and clarity score for each of the at least one chat answer. In step S1202, accuracy of each of the aforementioned at least one chat answer is evaluated to obtain an accuracy score for each of the at least one chat answer. In step S1203, based on a relevance algorithm, relevance between each of the at least one chat answer and the internal clarification query is evaluated to obtain a relevance score for each of the at least one chat answer.

In step S1204, based on the coherence and clarity score, the accuracy score, and the relevance score for each of the at least one chat answer, a best chat answer is selected from the at least one chat answer. In some embodiments of the disclosure, the output frontend 301 selects a chat answer for which the sum of the coherence and clarity score, the accuracy score, and the relevance score is maximum as the best chat answer.

It is worth noting that steps S1201 to S1203 do not need to be executed sequentially, and S1202 can be executed first, followed by S1201 and S1203, which will not be limited in the disclosure.

In some embodiments of the disclosure, the coherence and clarity algorithm includes a neural local coherence analysis model. The neural local coherence analysis model performs text clarity scoring by using local coherence between adjacent sentences. For the neural local coherence analysis model, further refer to the website https://aclan-thology.org/2020.coling-main.194.pdf, in the article: Panitan Muangkammuen, Sheng Xul, Fumiyo Fukumotol, Kanda Runapongsa Saikaew, Jiyi Li, A Neural Local Coherence Analysis Model for Text Clarity Scoring.

In some embodiments of the disclosure, the coherence and clarity algorithm is an automatic evaluation of text coherence algorithm. The automatic evaluation of text coherence algorithm targets various dimensions of text quality. For the automatic evaluation of text coherence algorithm, further refer to Lapata, M., Barzilay, R.: Automatic evaluation of text coherence: Models and representations. In: Kaelbling, L. P., Saffiotti, A. (eds.) IJCAI, pp. 1085-1090.

FIG. 13 is a flowchart of an artificial intelligence frontend operation method illustrated in accordance with some embodiments of the disclosure. In an embodiment illustrated in FIG. 13, step S1202 includes steps S1301 and S1302. In step S1301, the output frontend 301 finds multiple pieces of data most relevant to the aforementioned query from multiple trusted sources by a structural semantic similarity model (SSSM). In step S1302, the output frontend 301 provides an accuracy score for each of the at least one chat answer based on the aforementioned multiple pieces of data. The aforementioned multiple trusted sources may include The New York Times, The Washington Post, BBC News, CNN, Science Magazine, Nature, National Geographic, The Guardian, Reuters, and Associated Press.

Figure 5:
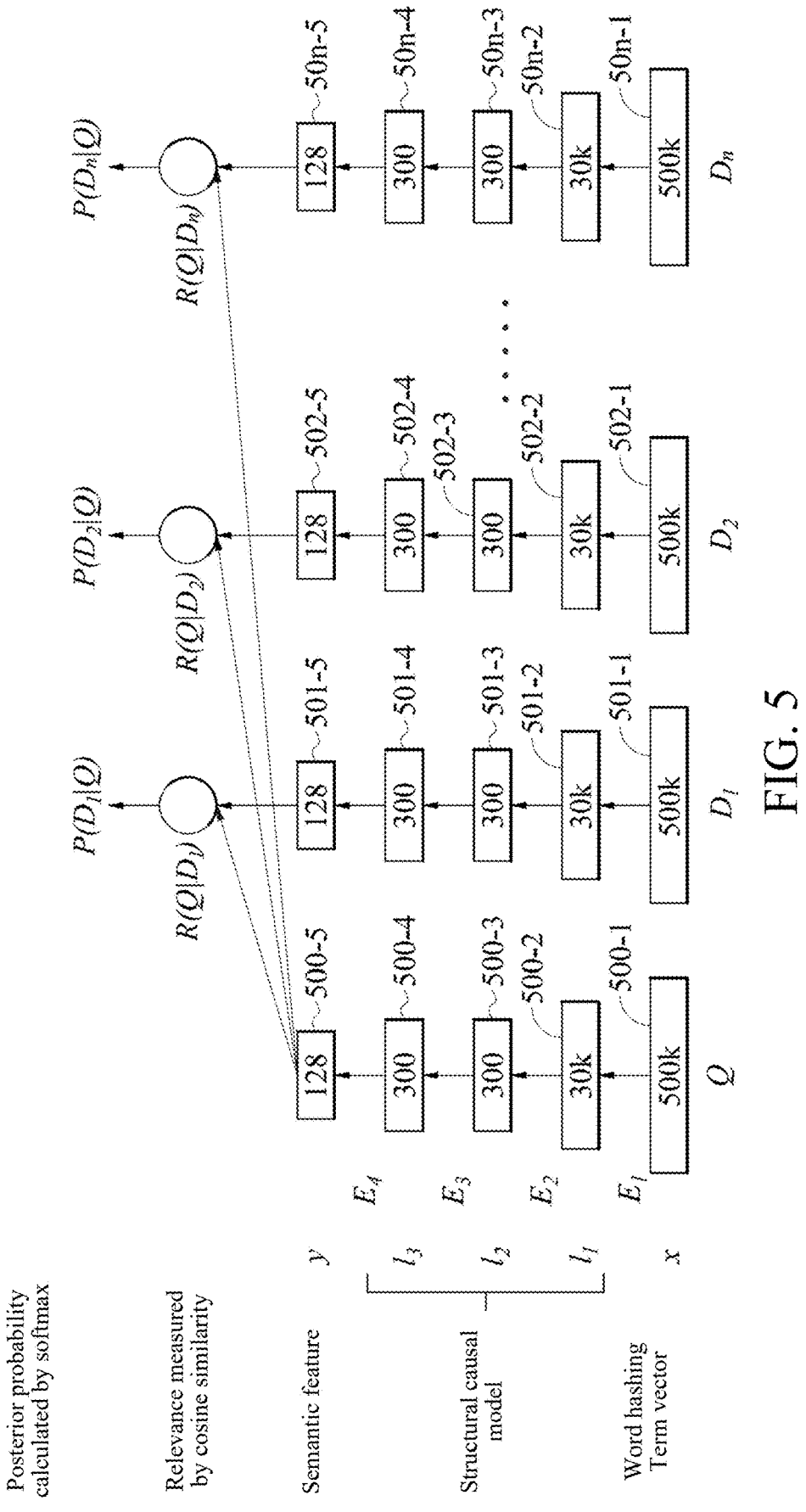
FIG. 5 is a schematic diagram of operation of a structural semantic similarity model illustrated in accordance with some embodiments of the disclosure.
Figure 6:
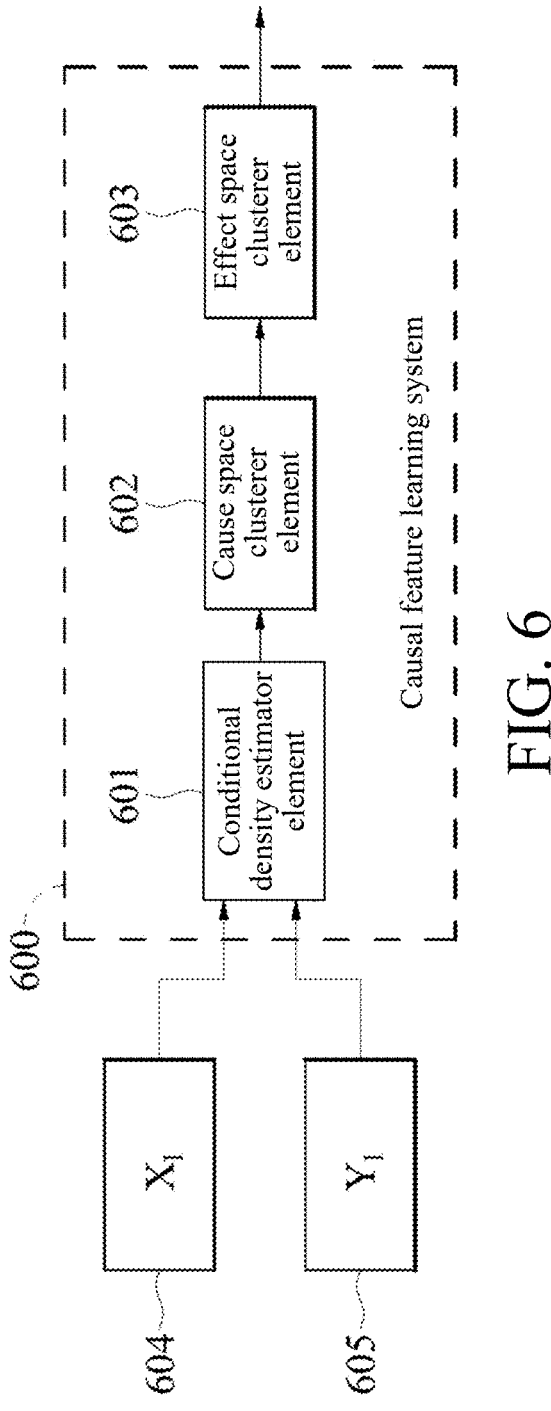
FIG. 6 is a block diagram of a causal feature learning system illustrated in accordance with some embodiments of the disclosure.

FIG. 5 is a schematic diagram of operation of a structural semantic similarity model illustrated in accordance with some embodiments of the disclosure. FIG. 6 is a block diagram of a causal feature learning system illustrated in accordance with some embodiments of the disclosure. Referring to FIGS. 5, 6, and 13, as shown in FIG. 5, the structural semantic similarity model is based on a structural causal model, including a causal graph and a set of structural equations, specifically explaining a causal relation between variables. Each rectangle (i.e., causal variables 500-1 to 500-5, 501-1 to 501-5, 502-1 to 502-5 . . . 50$n$-1 to 50$n$-5) on the structural semantic similarity model is a causal variable. $E_i$, i=1, . . . 4 represents a structural equation in the structural causal models $1_1$ to $1_3$, representing causality (including a cause and an effect) between two variables.

In step S1301, a term vector x is a query Q from the user 201, and data $D_1$ to $D_n$ is data from multiple trusted sources, where n is the number of the data. A structural equation $E_1$ of the structural causal model simulates "word hashing". Structural equations $E_2$ to $E_4$ of the structural causal model simulate layers of "multi-layer nonlinear projection". A semantic feature y is obtained by a causal feature learning system 600 illustrated in FIG. 6. In accordance with a conditional probability P ($D_i|Q$) of the data $D_1$ to $D_n$, the data $D_1$ to $D_n$ is sorted from high to low, where the conditional probability $P(D_i|Q)$ is calculated from relevance R ($Q|D_i$) via a softmax function, where i=1 . . . n. The output frontend 301 selects first k sets of data as multiple pieces of data most relevant to the aforementioned query. It is worth noting that the aforementioned k value can be set according to actual needs, which will not be limited in the disclosure.

Referring to FIG. 6 again, the causal feature learning system 600 illustrated in FIG. 6 includes a conditional density estimator element 601, a cause space clusterer element 602, and an effect space clusterer element 603. The conditional density estimator element 601 receives input data 604 (represented as $X_1$) and input data 605 (represented as $Y_1$) from the outside. The causal feature learning system 600 can be implemented in a software form in the output frontend 301, forming the conditional density estimator element 601, the cause space clusterer element 602, and the effect space clusterer element 603 at a logic level. For causal feature learning, further refer to the article: Wahle, Iman A. and Kahn, Jenna and Eberhardt, Frederick, Causal Feature Learning. The aforementioned article can be found on SSRN: https://ssrn.com/abstract=4066510 or http://dx-.doi.org/10.2139/ssrn.4066510.

Referring to FIG. 13 again, in some embodiments of the disclosure, step S1302 includes executing first, second, and third steps on a current chat answer in the at least one chat answer to obtain the accuracy score for the current chat answer. The output frontend 301 continuously selects unprocessed chat answers from the at least one chat answer as the current chat answer until the at least one chat answer is processed. In the first step, the output frontend 301 extracts respective semantic graphs from the current chat answer and the internal clarification query by using a semantic graph extraction algorithm. In some embodiments of the disclosure, the aforementioned semantic graph extraction algorithm is a SemanticGraph2Vec algorithm, where the SemanticGraph2Vec algorithm has the following three main steps: extracting semantic relationships, generating semantic walks, and learning semantic vertex representations. In some embodiments of the disclosure, the aforementioned semantic graph extraction algorithm is a TakeFive algorithm, where the TakeFive algorithm is a new semantic role labeling method that can transform text into a frame-oriented knowledge graph. For the SemanticGraph2Vec algorithm, further refer to the article: Etaiwi, W., and Awajan, A. (2023). Semanticgraph2vec: Semantic graph embedding for text representation. Array 17, 100276. doi: 10.1016/j.array.2023.100276. For the TakeFive algorithm, further refer to the article: Alam, M., Gangemi, A., Presutti, V. et al. Semantic role labeling for knowledge graph extraction from text. Prog Artif Intell 10, 309-320 (2021). https://doi.org/10.1007/s13748-021-00241-7.

In the second step, the output frontend 301 extracts causal graphs from the internal clarification query and the current chat answer, respectively. There are multiple methods to extract causal relations from text. These methods include knowledge-based methods, statistical machine learning-based methods, and deep learning-based methods. A graph structure learning algorithm that can be used for constructing the causal graphs according to data include the K2 algorithm and the MMHC algorithm. For the aforementioned knowledge-based methods, statistical machine learning-based methods, and deep learning-based methods, further refer to the article: Yang, J., Han, S. C. & Poon, J. A survey on extraction of causal relations from natural language text. Knowl Inf Syst 64, 1161-1186 (2022). https://doi.org/10.1007/s10115-022-01665-w. For the graph structure learning algorithm that can be used for constructing the causal graphs according to data, as well as the K2 algorithm and the MMHC algorithm, refer to the article: Ning An, Yongbo Xiao, Jing Yuan, Jiaoyun Yang, Gil Alterovitz, Extracting causal relations from the literature with word vector mapping, Computers in Biology and Medicine, Volume 115, 2019, 103524, https://doi.org/10.1016/j.compbiomed.2019.103524.

In some embodiments of the disclosure, the output frontend 301 extracts causal graphs from the internal clarification query and the current chat answer, respectively, by using the K2 algorithm. In some embodiments of the disclosure, the output frontend 301 extracts causal graphs from the internal clarification query and the current chat answer, respectively, by using the MMHC algorithm.

In the third step, the output frontend 301 compares the semantic graph of the internal clarification query with the semantic graph of the current chat answer, and compares the causal graph of the internal clarification query with the causal graph of the current chat answer.

In some embodiments of the disclosure, the output frontend 301 compares the semantic graph of the internal clarification query with the semantic graph of the current chat answer by using a graph-similarity-grading algorithm (refer to the technical content recorded at https://stackover-flow.com/questions/12122021/python-implementation-of-a-graph-similarity-grading-algorithm). In some embodiments of the disclosure, the output frontend 301 finds similarities between two graphs by using a deep learning technology (such as one-shot learning) (refer to the technical content t recorded at the website https://datascience.stackex-change.com/questions/46128/how-can-i-find-similarities-in-two-graphs). The aforementioned algorithm can be used for comparing two semantic representations without a need for flattening the representations.

In some embodiments of the disclosure, the output frontend 301 learns an embedding from a set of graphs into Euclidean space, and then calculates a notion of similarity between embedded graphs (refer to the article: Wills P, Meyer FG (2020) Metrics for graph guide. 15(2): e0228728. comparison: A practitioner's PLoS ONE https://doi.org/10.1371/journal.pone.0228728) to compare the causal graph of the internal clarification query with the causal graph of the current chat answer. In some embodiments of the disclosure, the output frontend 301 calculates similarity between two graph according to a mapping between their nodes (refer to the article recorded on the following website https://www.cs.cmu.edu/~jingx/docs/DBreport.pdf) to compare the causal graph of the internal clarification query with the causal graph of the current chat answer. Of course, the output frontend 301 can also compare the causal graph of the internal clarification query with the causal graph of the current chat answer based on other graph-similarity-grading algorithms (refer to the technical content recorded at the website https://stackoverflow.com/questions/12122021/py-thon-implementation-of-a-graph-similarity-grading-algo-rithm).

In some embodiments of the disclosure, the aforementioned relevance algorithm includes a structural semantic similarity model. A step of evaluating relevance between each of the at least one chat answer and the internal clarification query by using the structural semantic similarity model is the same as the aforementioned first, second, and third steps, which will not be repeated here.

Figure 7:
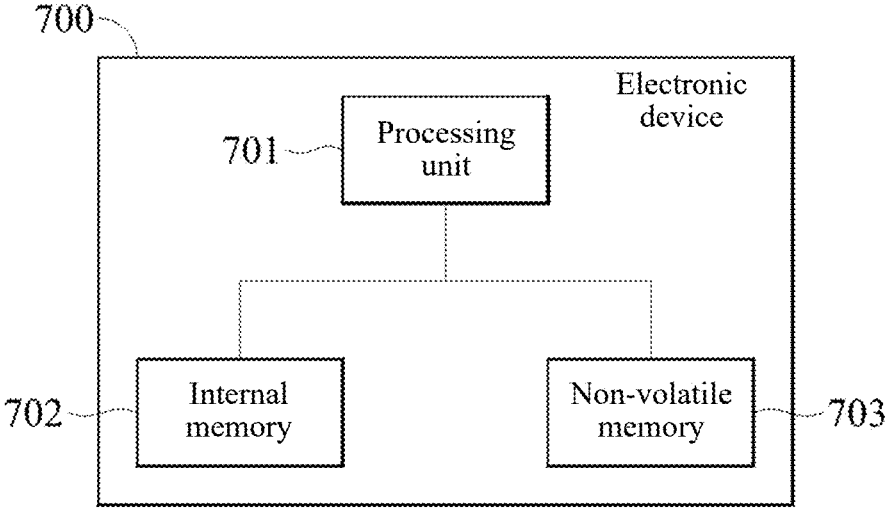
FIG. 7 is a block schematic diagram of a system of an electronic device illustrated in accordance with some embodiments of the disclosure.

FIG. 7 is a block schematic diagram of a system of an electronic device illustrated in accordance with some embodiments of the disclosure. As shown in FIG. 7, at a hardware level, an electronic device 700 includes a processing unit 701, an internal memory 702, and a non-volatile memory 703. The internal memory 702, for example, is a random-access memory (RAM). Of course, the electronic device 700 may further include hardware required for other functions.

The internal memory 702 and the non-volatile memory 703 are used for storing a program, where the program may include a program code. The program code includes a computer operating instruction. The internal memory 702 and the non-volatile memory 703 provide instructions and data to the processing unit 701. The processing unit 701 reads a corresponding computer program from the non-volatile memory 703 into the internal memory 702 and operates it, forming the artificial intelligence frontend system 100 and the artificial intelligence frontend system 300 at the logic level. The processing unit 701 is specifically configured to execute the steps recorded in FIGS. 8 to 13.

The processing unit 701 may be an integrated circuit chip, having signal processing capacity. In the implementation process, various methods and steps disclosed in the afore-mentioned embodiments can be completed by an integrated logic circuit of hardware in the processing unit 701 or an instruction in a software form. The processing unit 701 may be a general-purpose processor, including a central process-ing unit (CPU), a tensor processing unit, a digital signal processor (DSP), an application specific integrated circuit (ASIC), a field-programmable gate array (FPGA), or other programmable logic devices, and can implement or execute the methods and steps disclosed in the aforementioned embodiments.

In some embodiments of the disclosure, a computer-readable recording medium with a stored program is further provided. The computer-readable recording medium stores at least one instruction, which, when executed by the pro-cessing unit 701 of the electronic device 700, enables the processing unit 701 of the electronic device 700 to execute the steps recorded in FIGS. 8 to 13 mentioned above.

Examples of storage media for computers include, but are not limited to, a phase change random-access memory (PRAM), a static random-access memory (SRAM), a dynamic random-access memory (DRAM), other types of random-access memories (RAM), a read-only memory (ROM), an electrically erasable programmable read-only memory (EEPROM), a flash memory or other internal memory technologies, a compact disc read-only memory (CD-ROM), a digital versatile disc (DVD) or other optical storages, a magnetic cassette tape, a magnetic tape disk storage or other magnetic storage devices, or any other non-transmission media, which can be used for storing information that can be accessed by a computing device. In accordance with the definition in this article, computer-readable media do not include transitory media, such as modulated data signals and carriers.

Based on the above, some embodiments of the disclosure provide an artificial intelligence frontend system, an artifi-cial intelligence frontend operation method, a computer-readable recording medium with a stored program, and a non-transitory computer program product, where an external clarification query is obtained by executing an external clarification procedure and a filtering procedure is executed on the external clarification query to filter the external clarification query, and thus, a query from a user can be clearly defined, and an attacker is prevented from attacking a large language model of a chatbot.

Although the disclosure has been described in consider-able detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the descrip-tion of the preferred embodiments described above.

What is claimed is:

1. An artificial intelligence frontend system, executed on an electronic device, comprising an input frontend and an output frontend, the input frontend comprising an input filter element, the output frontend comprises an output filter element, wherein the input frontend is configured to execute the following steps:

(a) execute an external clarification procedure in response to receiving a query to obtain an external clarification query, and direct the external clarification query to the input filter element;

(b) execute, via the input filter element, a filtering procedure on the external clarification query to filter the external clarification query, and send, via the input filter element, the external clarification query which is filtered to an external chatbot;

(c) in response to the chatbot raising an internal clarification question, replying to the internal clarification question; and (d) in response to the chatbot raising a final question, redirecting an internal clarification query to the chatbot; and the output frontend is configured to execute the following steps after step (d);

(e) receiving, via the output filter element of the output frontend (301), at least one chat answer replied by the chatbot to the internal clarification query; and (f) finding, by the output frontend, a best chat answer from the at least one chat answer; wherein step (f) comprises the following steps:

(f1) based on a coherence and clarity algorithm, evaluating coherence and clarity of each of the at least one chat answer to obtain a coherence and clarity score for each of the at least one chat answer;

(f2) evaluating accuracy of each of the at least one chat answer to obtain an accuracy score for each of the at least one chat answer;

(f3) based on a relevance algorithm, evaluating relevance between each of the at least one chat answer and the internal clarification query to obtain a relevance score for each of the at least one chat answer; and (f4) based on the coherence and clarity score, the accuracy score, and the relevance score for each of the at least one chat answer, selecting the best chat answer from the at least one chat answer.

2. The artificial intelligence frontend system according to claim 1, wherein the external clarification procedure comprises the following steps:

(a1) setting the query as a current query;

(a2) judging whether the current query meets an explicit criterion or not;

(a3) in response to judging that the current query meets the explicit criterion, outputting the current query to serve as the external clarification query, and exiting the external clarification procedure;

(a4) in response to judging that the current query does not meet the explicit criterion, issuing an asked question based on the current query; and (a5) in response to receiving a response corresponding to the asked question, setting the response as the current query, and then executing steps (a2) to (a5).

3. The artificial intelligence frontend system according to claim 1, wherein the output frontend is configured to execute the following step after step (f):

(g) executing, via the output filter element of the output frontend, a modification procedure on the best chat answer to modify the best chat answer.

4. An artificial intelligence frontend operation method, suitable for an artificial intelligence frontend system, wherein the artificial intelligence frontend system comprises an input frontend and an output frontend, the input frontend comprises an input filter element, the output frontend comprises an output filter element, and the artificial intelligence frontend operation method comprises:

(a) executing, by the input frontend, an external clarification procedure in response to receiving a query to obtain an external clarification query, and directing the external clarification query to the input filter element;

(b) executing, by the input frontend via the input filter element, a filtering procedure on the external clarification query to filter the external clarification query, and sending, via the input filter element, the external clarification query which is filtered to an external chatbot;

(c) in response to the chatbot raising an internal clarification question, replying, by the input frontend, to the internal clarification question; and (d) in response to the chatbot raising a final question, redirecting, by the input frontend an internal clarification query to the chatbot, by the input frontend;

(e) receiving, via the output filter element of the output frontend, at least one chat answer replied by the chatbot to the internal clarification query; and (f) finding, by the output frontend, a best chat answer from the at least one chat answer; wherein step (f) comprises the following steps:

(f1) based on a coherence and clarity algorithm, evaluating coherence and clarity of each of the at least one chat answer to obtain a coherence and clarity score for each of the at least one chat answer;

(f2) evaluating accuracy of each of the at least one chat answer to obtain an accuracy score for each of the at least one chat answer;

(f3) based on a relevance algorithm, evaluating relevance between each of the at least one chat answer and the internal clarification query to obtain a relevance score for each of the at least one chat answer; and (f4) based on the coherence and clarity score, the accuracy score, and the relevance score for each of the at least one chat answer, selecting the best chat answer from the at least one chat answer.

5. The artificial intelligence frontend operation method according to claim 4, wherein the external clarification procedure comprises the following steps:

(a1) setting the query as a current query;

(a2) judging whether the current query meets an explicit criterion or not;

(a3) in response to judging that the current query meets the explicit criterion, outputting the current query to serve as the external clarification query, and exiting the external clarification procedure;

(a4) in response to judging that the current query does not meet the explicit criterion, issuing an asked question based on the current query; and (a5) in response to receiving a response corresponding to the asked question, setting the response as the current query, and then executing steps (a2) to (a5).

6. The artificial intelligence frontend operation method according to claim 4, wherein the artificial intelligence frontend operation method comprises executing the following step after step (f):

(g) executing, via the output filter element of the output frontend, a modification procedure on the best chat answer to modify the best chat answer.

7. The artificial intelligence frontend operation method according to claim 4, wherein the coherence and clarity algorithm comprises a neural local coherence analysis model.

8. The artificial intelligence frontend operation method according to claim 4, wherein the coherence and clarity algorithm comprises an automatic evaluation of text coherence algorithm.

9. The artificial intelligence frontend operation method according to claim 4, wherein step (f2) comprises the following steps:

(f21) finding, by a structural semantic similarity model, multiple pieces of data most relevant to the query from multiple trusted sources; and (f22) based on these pieces of data, providing the accuracy score for each of the at least one chat answer.

10. The artificial intelligence frontend operation method according to claim 4, wherein the relevance algorithm comprises a structural semantic similarity model.

11. The artificial intelligence frontend operation method according to claim 4, wherein the filtering procedure comprises:

(b1) executing an input transformation on the external clarification query as a defense mechanism to eliminate adversarial perturbations.

12. The artificial intelligence frontend operation method according to claim 11, wherein the filtering procedure comprises based on the context of a dialogue, adding a more detailed query requirement into the external clarification query undergoing the input transformation.

13. The artificial intelligence frontend operation method according to claim 11, wherein the filtering procedure comprises: transforming the external clarification query undergoing the input transformation into an open question form.

14. A non-transitory computer-readable recording medium with a stored program, wherein an artificial intelligence frontend system is formed at a logic level when a processing unit loads and executes the stored program, the artificial intelligence frontend system comprises an input frontend and an output frontend, and the input frontend comprises an input filter element, the output frontend comprises an output filter element, and executes the following operations:

(a) executing, by the input frontend, an external clarification procedure in response to receiving a query to obtain an external clarification query, and directing the external clarification query to the input filter element;

(b) executing, by the input frontend via the input filter element, a filtering procedure on the external clarification query to filter the external clarification query, and sending, via the input filter element, the external clarification query which is filtered to an external chatbot;

(c) in response to the chatbot raising an internal clarification question, replying, by the input frontend, to the internal clarification question; and (d) in response to the chatbot raising a final question, redirecting, by the input frontend an internal clarification query to the chatbot, by the input frontend;

(e) receiving, via the output filter element of the output frontend, at least one chat answer replied by the chatbot to the internal clarification query; and (f) finding, by the output frontend, a best chat answer from the at least one chat answer; wherein step (f) comprises the following steps:

(f1) based on a coherence and clarity algorithm, evaluating coherence and clarity of each of the at least one chat answer to obtain a coherence and clarity score for each of the at least one chat answer;

(f2) evaluating accuracy of each of the at least one chat answer to obtain an accuracy score for each of the at least one chat answer;

(f3) based on a relevance algorithm, evaluating relevance between each of the at least one chat answer and the internal clarification query to obtain a relevance score for each of the at least one chat answer; and (f4) based on the coherence and clarity score, the accuracy score, and the relevance score for each of the at least one chat answer, selecting the best chat answer from the at least one chat answer.

\* \* \* \* \*